May 30, 1961  A. HOLZNER  2,985,998
CYCLOMETER, COUNTER OR THE LIKE
Filed Nov. 14, 1955  5 Sheets-Sheet 2

INVENTOR:
ADOLF HOLZNER
BY Augustus M. Henry
ATTORNEY

May 30, 1961  A. HOLZNER  2,985,998
CYCLOMETER, COUNTER OR THE LIKE
Filed Nov. 14, 1955  5 Sheets-Sheet 4

*INVENTOR:*
ADOLF HOLZNER
BY
ATTORNEY

May 30, 1961   A. HOLZNER   2,985,998
CYCLOMETER, COUNTER OR THE LIKE
Filed Nov. 14, 1955   5 Sheets-Sheet 5

INVENTOR:
ADOLF HOLZNER
BY Augustus M. Henry
ATTORNEY

United States Patent Office 2,985,998
Patented May 30, 1961

2,985,998
CYCLOMETER, COUNTER OR THE LIKE
Adolf Holzner, Merrick, N.Y.
(Dix Hills, Huntington, N.Y.)
Filed Nov. 14, 1955, Ser. No. 546,495
11 Claims. (Cl. 58—125)

This invention relates to clocks of the cyclometer type, with direct reading numerals, such as shown in U.S. Patents 2,351,814 and 2,636,339 to me.

One of the main objections to clocks of this kind as previously developed is the considerable friction loss encountered, for drive and advance, especially in the case of a numeral carrier having four numeral positions to be read, where, in arrangements heretofore proposed, considerable force is necessary to drive time-of-day display means constituted by such a clock.

This present invention has for one of its purposes, the elimination of the above referred to difficulties and inefficiencies.

A main object is the provision of a mechanism in which all moving shafts are vertical and they may practicably be journaled on needle or ball bearings.

Another object is to simplify arrangements as previously proposed by me and involving nested wheels, whereby more economical manufacture may be effected, as where the intended utility is for the making of clocks or counters. In my said previous Patent 2,351,814 I employed eight different parts for operation of the nested drums; in the present invention this complexity is considerably cut down, to four different parts. In addition, which is of importance, even in using a total of eight parts, I have improved the manner of appearance and disappearance of various numerals in such manner that this operation has been so perfected that the visual effect always produced is such that during advance of a numeral to a display location, said numeral follows the numeral then leaving said location, as on the conventional counter wheels. In my said former patent, it may further be explained, there still remained the objection that once in its cycle one numeral, as the numeral "5," stood stationary while it was being gradually, covered by the following numeral "6." This was even more noticeable when numerical members of an adjoining series of numerals were making their sequential appearances in a manner correctly to give the proper numerical total.

Otherwise stated, in the case of the present invention a cardinal aim is the provision of means for the display of consecutive numerals in such a way that one numeral will always completely disappear and thereafter another number will fully appear in rotation in one continuous uninterrupted cycle and in proper successive order, one numeral at a time (during rotation in either adding or subtracting direction). As will now be clear or be made plain hereinafter, the new feature just described makes possible the use of graduation marks between successive numerals on a numeral carrier such as a drum or dial; such graduations for marking, as in the case of a 12-hour or 24-hour clock for example, the seconds between minutes-significant numerals, or for another example to mark the minutes between degrees in azimuth or elevationally, as in a compass or gun pointing mechanism.

An object of the invention is to provide by the present invention a mechanism which has the advantage of posting numerals at a location where a pair of nested drums are employed, with the inner drum having a blank peripheral subdivision and with the other drum having an opening, yet wherein there will be such a cooperative movement of the parts that the blank space will never be visible. The blank space in prior art will be seen after displaying all the numerals such that the cycle, consequently, is interrupted. True, the aforesaid Patent 2,351,814 to me makes it possible to display one numeral after another in contrast to prior art; yet in a manner of speaking the cycle in my said Patent 2,351,814 is actually interrupted in the sense that once in the display of the ten numerals one numeral stands still and is gradually covered by another drum as mentioned in the second preceding paragraph. This provision of my said Patent 2,351,814 is herein improved, because the prior device does not display numerals as in known conventional counters with single drums each having numerals "0" to "9" inclusive thereon. In other words, it was not possible in the nested drum construction of my said Patent 2,351,814 to provide the nested drums with graduation lines and numerals according to an arrangement whereby one leading numeral is always followed by a trailing numeral as well as by the graduation lines when such graduation lines are used between the numerals.

According to the present invention, the operative connections and timing are such, it might be well also to explain, that inside and outside wheels or drums (referring now to the nesting of one drum within another), or front and rear dials—with each of said outside drums of each of said front dials, as the case may be, having an opening—operate both at the same time twice in one cycle; once when said opening in the outer drum or front dial appears, and once when said opening disappears.

To achieve this result, the arrangement is such, in, for example, a construction having a pair of drums one nested in the other, that the inside drum circumferentially thereof has six subdivisions, that is to say, five subdivisions each provided with a different one of a series of numerals and graduation marks, as the numerals "4," "5," "6," "7" and "8," with the sixth subdivision left blank; the arrangement further being such that this sixth subdivision, or space, as it will be called, will never be visible in a continuous cycle display. In combination with the foregoing, the outside drum, also circumferentially thereof having six subdivisions, is provided with the other half of the series of numerals "0" through "9," that is, with the numerals "9," "0," "1," "2" and "3" each at a different one of five of said subdivisions, and with the sixth subdivision carrying no numeral. Said sixth subdivision of the outside wheel is, of course, the aforesaid opening in the outer drum.

The present invention, it is explained, can be applied for the making of cyclometer clocks, counters and the like, having vertically or horizontally disposed flat dials, instead of nested drums on horizontal axes as, hereinabove referred to, and as, for instance, in said Patent 2,636,339 to me. For instruments with flat dials, also, it would be of considerable importance to be able to place such a series of numerals and graduation lines on two dials instead of on the conventional single dial. This will result in much clearer and larger and hence more easily and/or more distantly visible indications, particularly in many utilizations of the invention, such, for instance, as for a 60-seconds time display, a 60-minutes degrees display for various instrument panels, as on speedometers, and in connection with a 360° dial used as a compass dial, etc. etc.

To refer now to another marked advantage of the present invention, for illuminative purposes it is entirely practicable, in an embodiment of the invention incorporating one or more pairs of drums with at each such pair an inner drum nested in an outer drum, to have both drums of Lucite or other suitable translucent material—or, in the case of a construction involving a plurality of dials, these could be of Lucite or other suitable translucent material; with both drums, or both dials, as the case may be, having their assigned numerals and inter-numerals graduations printed, engraved or otherwise inscribed thereon; and all the foregoing in combination with a source of illumination, as an electric light bulb, within the inner one of a pair of nested drums, or behind a pair of dials. This advantage is made possible because according to the operative cycle of the present invention, never is a numeral on an outer drum brought to rest so as to overlap a numeral on a drum nested inside said outer drum; and the same as to a pair of dials.

An advantageous feature of the present invention is that, in contradistinction to the structures illustrated in the aforesaid U.S. Patents 2,351,814 and 2,636,339 to me, a plurality of pairs of inter-nested drums are provided the axes of rotation of which are vertical instead of horizontal, and consequently, not only do the numerals being displayed appear and disappear along a horizontal line of travel, but this last-mentioned fact allows a looser gear train to be tolerated, any back-lash present being relatively unimportant because less noticeable that in a device where the axis of rotation of the drums is horizontal—in which last-mentioned arrangement the numerals must appear and disappear in an upward or downward direction. Furthermore, in an arrangement wherein the drums rotate on vertical axes, for giving numerical readings in counters or clocks, important advantageous features are freedom of motion, less force required to effect rotations, and smaller gears and smaller drums than heretofore thought possible; these last exceptionally valuable in high-speed counters. And in regard to high-speed counters, moreover, there is less "transferring" (i.e., as from a drum of a lower numerical "place" to a drum of the next higher numerical "place") momentum, than occurs with the use of drums on a horizontal axis.

Another feature of the present invention is that by the various provisions made, including those already referred to, it is possible to provide a construction in which a vertical drum of ½" outside diameter is able to display a numeral about 7/16" high, whereas to display a numeral of that height on a horizontal drum said drum would have to have an outside diameter of 1⅝".

Also, a positively locking species of Geneva movement of very simple type, and of a kind easy to fabricate at low cost, is combined with the driving gear train, to insure that vibration cannot disturb the time reading of a cyclometer or the total reading of a counter.

Still a further feature of the present invention is the independent sub-assembly of all the parts directly mechanically acting on the drums to cause rotations thereof—such as full gears, mutilated or intermittent gears, locking discs, driven discs, etc., in a complete operative group, and the placement of said group in a special compartment, at the top or bottom of the cyclometer or counter casing; in combination with the placement of the numeral carriers in a different compartment, and there assembled independently of the assembly of the members of the gear train and coadjuvant parts in said special compartment.

Other objects, features and advantages of the present invention will be pointed out or become apparent hereinafter.

In exemplification but not in limitation of the invention, certain now preferred embodiments thereof are shown in the accompanying drawing; in which—

Now referring in detail to the accompanying drawings, and first to Figs. 1 through 18:

At 60 is shown an electric motor, operating at a speed of one r.p.m. Secured to its vertical shaft 60a (Fig. 1) is a driving disc 61 fixedly carrying, at a location in a plane below that of said disc, a multilated gear 62 having two teeth. Said part 61 is similar to the element shown at the right in Fig. 8, and said part 62 is similar to the element shown at the right in Fig. 9.

Fixed on a vertical shaft 63, and for coaction with said driving disc 61, is a disc 63' (similar to the driven disc shown at the left in Fig. 4); while also fixed on said shaft 63, below said driven disc 63' is a gear 64 aligned with said mutilated gear 62 having two teeth.

As will become clear, the parts just above described constitute a species of Geneva movement.

Figure 4:
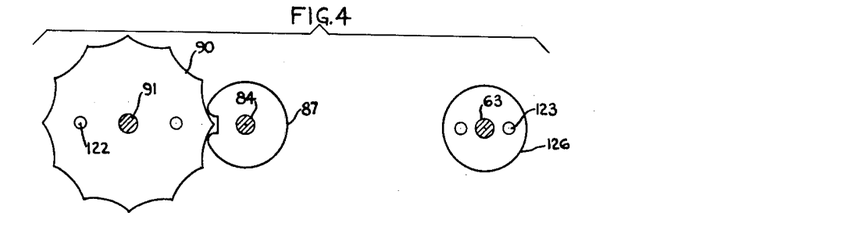
Figs. 4, 5, 6, 7, 8, 9, 10, 11, 12 and 13 are horizontal sections taken, respectively on the lines 4—4, 5—5, 6—6, 7—7, 8—8, 9—9, 10—10, 11—11, 12—12 and 13—13 of Fig. 3.
Figure 5:
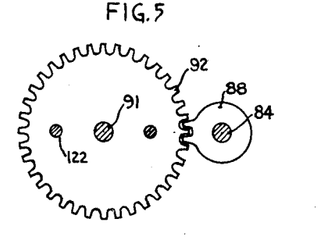
Figure 6:
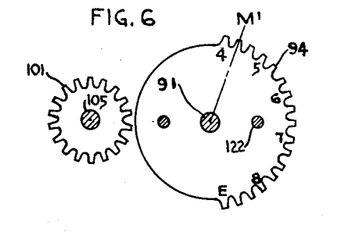
Figure 7:
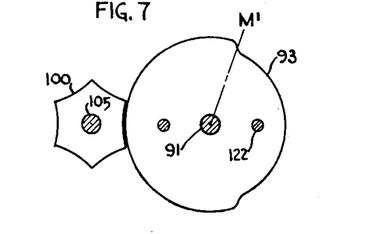
Figure 8:
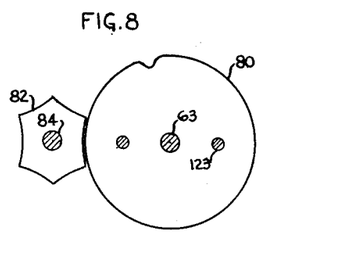
Figure 9:
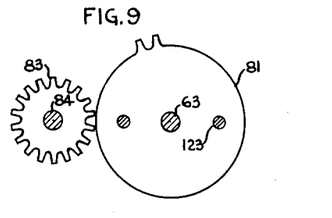

Every time the motor shaft 60a makes one revolution, that is, every minute, there is effected one-tenth of a revolution of said driven disc 63' last mentioned; this disc differing in one respect only from the similar disc as aforesaid shown at the left in Fig. 4 because while the latter has twelve, the disc 63' has only ten, equal peripheral subdivisions each circularly concave; and there is effected, simultaneously, by way of the mutilated gear 62, one-tenth of a revolution of the gear 64, which latter has ten teeth.

Said circularly concave peripheral subdivisions of the locking discs just above referred to, and similar shapings of other analogous elements later to be mentioned, will hereinafter, for simplicity of description, be called notches.

Figure 1:
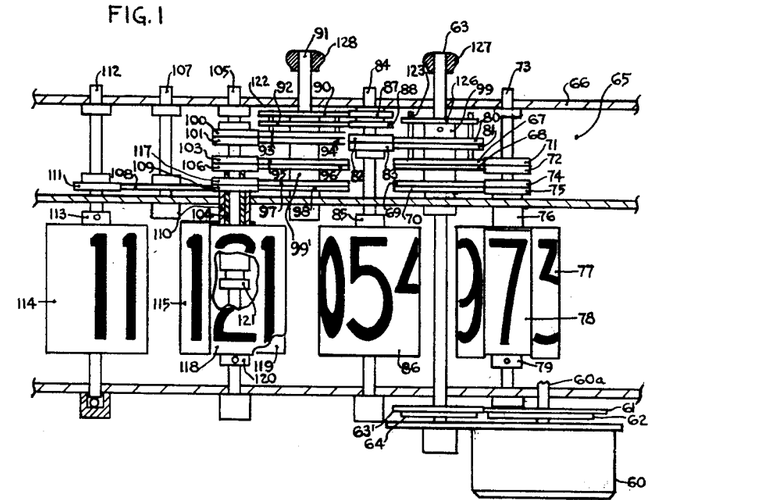
Fig. 1, wherein casing upper and lower walls, an intervening horizontal partition, and other parts, are seen in vertical section, is a front elevational view of a 12-hour clock or cyclometer.
Figure 3:
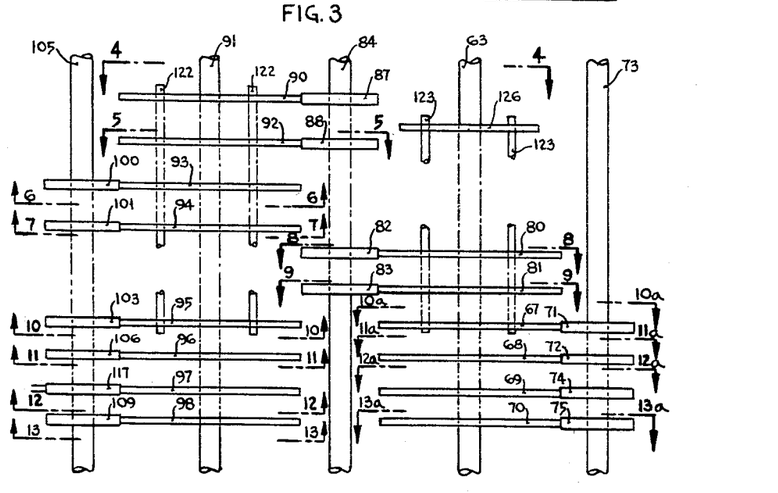
Fig. 3 is a view corresponding to Fig. 1 but on a much larger scale, showing merely the members of said gear train and the said coadjuvant parts, with the mechanism comprised of said members and parts exploded or expanded vertically or along the axes of the seven shafts carrying said members and parts—this for the purpose of permitting various horizontal section lines to be depicted without detracting from the clarity of the showing of said mechanism as illustrated in Fig. 1.

On said shaft 63, at the upper portion thereof extended upwardly into a top compartment 65 within a main casing 66, are operating parts (Fig. 1) including (see also Figs. 3, 10, 11, 12) a locking disc 67 typical of one form of Geneva movement, a mutilated gear 68, another locking disc 69 (identical with disc 67), and another mutilated gear 70 (identical with gear 68), these parts 67, 68, 69, and 70 being secured together in the relation shown in Figs. 1 and 3 to constitute in effect an integral group of parts, said group being loose on the shaft 63 to the extent that said shaft 63 in a longitudinal direction can move up and down through said group of parts. In the rotational direction said group of parts are operatively connected to said shaft 63.

Said disc 67 (Figs. 3 and 10a) periodically engages in one of the six notches of a driven disc 71, and the gear 68 engages a gear 72; the disc 71 and gear 72 being both fast on a vertical shaft 73.

The locking disc 69 on said shaft 63 is edgewisely aligned with a driven disc 74 (Figs. 3 and 12) which part 74 lies underneath the parts 71 and 72 and is axially aligned therewith. At 70 (Figs. 3 and 13A) is shown a mutilated gear, and the parts 74 and 75 are attached to a bushing 76, and secured to and suspended from this bushing is a "units of minutes" drum 77, said drum shown as having an opening or window 77a being the outer one of a pair of nested drums at the units-of-minutes station or numerical "place" in an exposed line of numerals each constituting one of the digits of a four-digit number, as, for example, "1222," to indicate the time as 22 minutes after twelve o'clock.

The other drum 78 of said pair is the inner drum at said units-of-minutes station; said inner drum being secured to and resting on a small hub or collar 79 fast on said shaft 73, and having an empty or blank space 78a.

Rotatively carried said shaft 63, above the group of parts 67, 68, 69 and 70, are (Figs. 3, 9 and 8) a locking disc 80, and a mutilated gear 81 with two teeth; these parts 80 and 81 corresponding, respectively, to the said mutilated gear 62 and locking disc 61. The members of the structure 80–81 engage respectively the members of a couple 82 and 83 secured to said shaft 84; the members last named (82 and 83) corresponding, respectively, to the driven disc 71 and the gear 72 of Figs. 3, 10 and 11.

A vertical shaft 84 has fast thereon a hub or collar 85 to which is secured and from which is suspended a "tens of minutes" drum 86. Also fast on said shaft is (Figs. 3, 4 and 5) a "transferring" mutilated driving gear 88 and a locking disc 87, which disc 87 is edgewisely aligned with a driven disc 90 having its periphery inclusive of twelve notches and secured to a shaft 91. Said mutilated gear 88 (Figs. 3 and 5) is one member of a cooperant couple the complementary member of which is a gear 92, secured to the shaft 91 and shown as having circumferentially thereof 36 teeth; it being at this juncture pointed out that of course the number of teeth on the gear 92 is unimportant, provided only that with a suitably chosen number of teeth on gear 88 (as herein shown), the velocity ratio as between gears 88 and 92 is such that each time the gear 88 operates, that is, once during each complete revolution thereof, the said gear 92, and with it the driven disc 90, makes one-twelfth of a revolution.

As will become clear, the two just referred to parts 88 and 92 are included in the mechanism for at suitable time intervals moving "units of hours" and "tens of hours" drums corresponding respectively, to the "units of minutes" drums 77 and 78 and to the "tens of minutes" drum 86; further details in regard to all of which drums will hereinbelow be given.

Said vertical shaft 91 has thereon another unit (Figs. 3, 6, 10, 11 and 12) consisting of a locking disc 93, a mutilated gear 94, a locking disc 95, a mutilated gear 96, a locking disc 97 and a mutilated gear 98, all secured together and to a sleeve 99' loose on said shaft 91.

Figure 10:
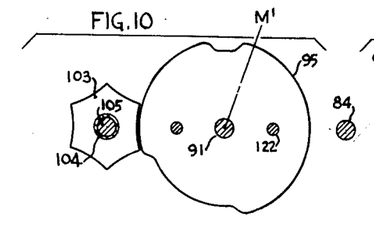
Figure 11:
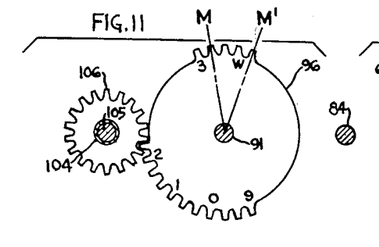

Also, a driven disc 100 and a gear 101 are secured to a vertical shaft 105; these elements 100 and 101 corresponding, respectively, to the six-notched driven disc 71 (Fig. 10) and the 18-toothed gear 72 (Fig. 11).

Said locking disc 93 is edgewisely aligned with said driven disc 100; the said mutilated gear 94 constitutes with said gear 101 an operative couple; said locking disc 95 is aligned with a driven disc 103 fast on a bushing 104 in the form (Fig. 1) of a sleeve on a shaft 105; and the mutilated gear 96 constitutes with a gear 106 also fast on the bushing 104 a cooperant couple—said driven disc 103 and the gear 106 corresponding, respectively, to the six-notched driven disc 71 and the 18-toothed gear 72 of Figs. 10 and 11.

A vertical shaft 107 has fast thereon a motion transmitting gear 108 meshing with a gear 109 fast on a second bushing 110 on the shaft 105 and with another gear 111 fast on a vertical shaft 112; said shaft 112 carrying a collar 113 to which is secured and from which is suspended a "tens of hours" drum 114.

Figure 18:
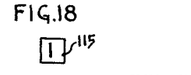
Fig. 18 is a similar view of the numeral-carrying face of a drum-fraction, with the numeral "1" thereon, for serving a useful purpose at the "units of hours" location as will hereinafter be explained.

The bushing 104 on shaft 105 carries the bushing or collar 110 freely rotatably thereon; to which bushing or collar 110 is secured the free end of a horizontally offset leg from the top of a drum-fraction 115 carrying in display location thereon the numeral "1" (Figs. 1 and 18).

Figure 17:
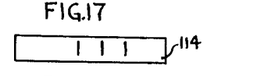
Fig. 17 is a development of a drum illustrating a possible arrangement of numerals on such drum as used at the "tens of hours" location.

As will be seen clearly from Fig. 17, the "tens of hours" drum 114 is subdivided circumferentially thereof into six areas, three of which are blank and at each of three others of which is the numeral "1."

Obviously, a "tens of minutes" drum 86 carries merely the numerals "0," "1," "2," "3," "4" and "5."

Figure 10A:
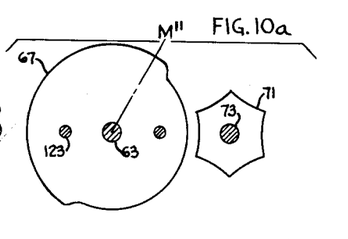
Figs. 10A, 11A, 12A and 13A are horizontal sections taken, respectively, on the lines 10A—10A, 11A—11A, 12A—12A and 13A—13A of Fig. 3.
Figure 11A:
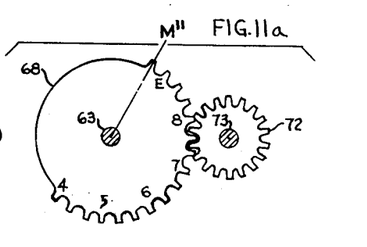
Figure 12:
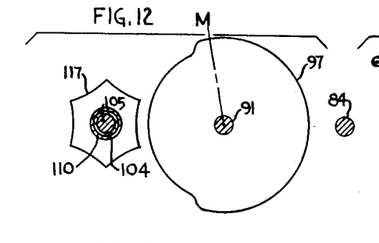
Figure 12A:
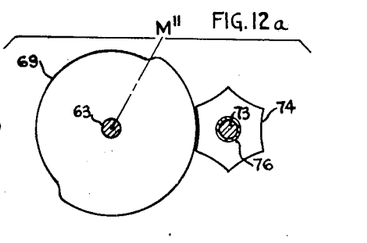

Referring next in detail to the operative elements at the "units of hours" station or numerical "place," the aforesaid parts 100 and 101 are both secured to the vertical shaft 105 as already stated; and these parts 100 and 101 correspond, respectively, to the driven disc 72 and the gear 71 of Figs. 10A and 11A, as already stated.

The disc 93 secured as aforesaid to the sleeve 99' loose on shaft 91 is edgewisely aligned with the disc 100, the mutilated gear 94 is adapted to engage with gear 101, the locking disc 95 is aligned with the driven disc 103, the mutilated gear 96 is adapted to engage with the gear 106, the disc 97 is edgewisely aligned with a driven disc 117 on the bushing 110, and the mutilated gear 98 is adapted to engage in gear 109 also on bushing 110; with here again driven discs (the discs 103 and 117) and driven gears (the gears 106 and 109) corresponding, respectively, to the driven disc 71 and the driven gear 72 secured thereto, of Figs. 3, 10A and 11A.

The driven disc 103 and the gear 106 are secured to the bushing or sleeve 104, the latter freely rotatable on the shaft 105, there being attached to and suspended from said sleeve the outer drum 118 at the "units of hours" station. The driven disc 117 and the gear 109 are secured to the sleeve 110, said sleeve surrounding the sleeve 104 and being freely rotatable thereon. Disc 117 is aligned with the locking disc 97 and gear 109 with the mutilated gear 98. The inner drum 119 at the station is secured to a hub 120 and this hub is secured to the shaft 105.

The inner and outer drums 118 and 119 at the "units of hours" station are constructed and carry display numerals exactly as will hereinafter be described for the inner and outer drums (78 and 77) at the "units of minutes" station.

Figure 2:
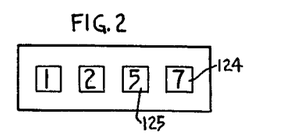
Fig. 2 shows said clock or cyclometer, also in front elevation but on a reduced scale, and with a front cover plate in place.

As can be seen from Fig. 1, at the "units of minutes" station the time indicated is "7," at the "tens of minutes" station the time indicated is "5," at the "units of hours" station the time indicated is "2," and at the "tens of hours" station the time indicated is "1." All this is perhaps more clearly seen in Fig. 2.

Each of the vertical shafts 73, 63, 84, 91, 105, 107 and 112 is journaled in an anti-friction manner at its lower end on a ball bearing as shown most clearly in Fig. 1 in the case of the shaft 112.

At 121 is shown a collar fixedly carried by shaft 105, for the purpose of keeping properly elevated the parts 117 and 109 and 103 and 106 to prevent dropping down of the same sufficiently to touch the floor wall of the aforesaid top compartment 65 of the main casing 66 thereby to set up an unnecessary friction drag on the motor 60. A similar collar and for a similar purpose is on the shaft 73 at the interior of the inner drum 78 at the "units of minutes" display location.

Figure 15:
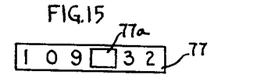
Figs. 15 and 16 are developments, on a much reduced scale, of the peripheries of, respectively, the outer drum and the inner drum, with numerals arranged thereon in a now favored way of practising the invention, as where such a pair of drums might be used at the "units of minutes" location and also at the "units of hours" location.
Figure 16:
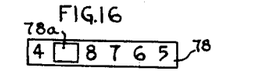

As will be seen from Figs. 15 and 16, the outer drum 77 at the "units of minutes" location or numerical "place" is subdivided circumferentially thereof into six equal areas, at one of which is said opening 77a and at each of the other five of which is one of the numerals "9," "0," "1," "2" and "3"; and the drum 78 nested in said drum 77 is also circumferentially thereof subdivided into six equal areas, with, however, one of said areas blank, as at 78a, and with at each of the other five of said areas one of the numerals "4," "5," "6," "7" and "8."

As will be seen from Fig. 3, when examined in the light of the left half of Fig. 4 and Figs. 5, 6, and 10, the driven disc 90 directly overlies the parts 92, 93, 94, 95, 96, 97 and 98 these in a stack downwardly extending in the order of their recital just above, and said parts are coupled by pins 122, 122 for rotation as one five-strata-high unit on the shaft 91. The said parts 92, 90, 93, 94, 95 and 96 are so arranged that the radial elements thereof indicated by the dot-and-dash lines M'; one in each of Figs. 6, 7, 10 and 11, are all in the same vertical plane wherein lies the axis of shaft 96. Thus, for example, said line, running on the drawing northeasterly from said shaft axis passes through the second tooth from the left of part 94 in Fig. 6 and through the last tooth at the right in Fig. 11. Also, the radial line M" of Fig. 11A is in the same vertical plane with the radial line M" of Fig. 13A. Further, the radial line M of Fig. 11 is in the same vertical plane with the radial line M of Fig. 13. From these observations, the relationship in which the parts 93, 94, 95, 96, 97 and 98 are locked together by pins 122, 122 is made plain.

Operation (Figs. 1 through 18)

During energization of the motor 60, the shaft 63 is rotated one-tenth of a revolution, as already stated, on each complete revolution of the motor shaft 60a. Therefore, at the end of one minute after the attainment in time at which the readings on the device as shown in Figs. 1 and 2 became established as described in the paragraph immediately above, the reading at the extreme right in Fig. 2 will be changed to "8"; because gear 68 in engagement with gear 72 has rotated the latter (in a counter-clockwise direction as seen in Fig. 11A to an extent to move the tooth "8" out of gear 68 to the position shown in Fig. 11A as occupied by the tooth "7." Simultaneously, since the gears 70 and 68 move as one unit, the tooth "E" of the gear 68 is maintained in radial alignment with the tooth "9" of the gear 70, to prepare said tooth to form a prevised operation as described in the following paragraph.

Figure 13:
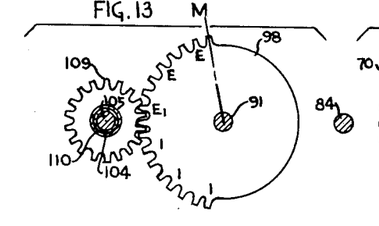
Figure 13A:
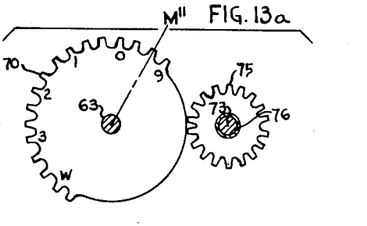

As a result of the just referred to movement of the gear 70, the tooth "9" thereof will, on the next one-tenth revolution of the shaft 63, be advanced to the position shown in Fig. 13a as occupied by the tooth "7" of the gear 68; and gear 68, moving with the gear 70 because in effect unitary therewith, is so rotated as correspondingly to advance the tooth "E" of the gear 68, thereby to turn the outer drum 77 (this drum opposite the window 124 of Fig. 2) in a direction to cause the "9" on the outer drum 77 apparently to travel toward the right in Fig. 2, and, simultaneously to turn the inner drum 78 in the same direction, thereby to substitute for the "8" a "9" at said window 124. During these movements, as always during operation of the device, neither drum visibly halts. As a matter of fact (and the achievement of this result, as already stated, is one of the important features of the present invention), as the "8" on the inner drum 78 travels toward the right at the window 124 in Fig. 2, the "9" on the outer drum 77 also travels in that direction but wholly after the "8" as though on the same drum with the latter; and when the "8" has fully disappeared and the "9" has fully appeared, the inner drum 78 halts. But this of course cannot be seen.

In the above connection, it is pointed out, as explained in the description of structural details, that the gear 70, meshing with the gear 75, drives the latter for causing rotation of the outer drum 77, and the gear 68, meshing with the gear 72, drives the inner drum 78. It will be noted, from Fig. 13A, that the gear 70, said gear being as aforesaid a mutilated one, or an intermittent one, is provided with seventeen teeth on the periphery thereof, the rest of the periphery being smooth and of a diameter about or somewhat less than the root diameter of said gear. Gear 68 is similar in all respects to gear 70, but these two gears are so relatively fixed that the smooth portion of one gear is made fast opposite the toothed portion of the other, one gear being displaced 180° from the other so that four teeth of two gears 68 and 70 are aligned and so that two teeth of two gears are always aligned 180° apart.

On the next one-tenth revolution of the shaft 63, the "0" on the outer drum will appear at the window 124 of Fig. 2, and so on, until the "3" on the outer drum 77 appears at said window. However, at that moment said "3" of the outer drum 77 will disappear at said window, and the "4" on the inner drum 78 will appear. This change of numerals at the window 124 occurred due to the fact that by now the tooth "W" of gear 70 has reached the position shown in Fig. 11A as occupied by the tooth "7" of said gear 68 and also due to the fact that the tooth "4" of the gear 68, which as aforesaid moves as a unit with the gear 70, of course remains in radial alignment with said tooth "W" of gear 70; and as a consequence, and by way of the gear 70, the outer drum 77 is rotated one-sixth of a revolution, thereby to move away from the window 124 the numeral "3" on said outer drum and to cause to be substituted for said "3" at said window the numeral "4" on the inner drum 78, at said window, in the same manner as described above in connection with the transition from "8" to "9," except that here it is the outer drum 77 which halts when the transition is completed.

In connection with the foregoing, it is explained that in Figs. 11A and 13A the marking of various teeth of certain mutilated gears with the indicia "1," "2," "3," "4," "5," "6," "7," "8," "9" and "0" is to assist in making clear the relation of the position of any such tooth to the display at the "units of minutes" location of a corresponding numeral; and it is explained also that the use in said view of other indicia including the indicium "E" and the indicium "W" is in the case of the "E," to refer to the space ("empty space," as it were) 78a of the inner drum 78, and, in the case of the "W," to refer to the opening (or "window," as it were) 77a of the outer drum 77.

In this case also, during these movements, as always during operation of the device, neither drum visibly halts. As a matter of fact, as the "3" on the outer drum 77 travels toward the right at the window 124 in Fig. 2 the "4" on the inner drum 78 also travels in that direction but wholly behind the "3" as though the same drum with the latter; and when the "3" has fully disappeared and the "4" has fully appeared the outer drum halts. But this of course cannot be seen.

From then on the operation continues as above, with periodically performed one-sixth revolutions of the inner drum 78, until the numeral "7" again appears at the window 124 as shown in Figs. 1 and 2.

Attention is directed to the fact that where use is made of a pair of drums, one nested in the other, as has been described as being the case (the drum 77 and 78) for the "units of minutes" location or "place," the arrangement is such that when either the drum 77 or 78 is given a fractional rotation for the purpose of changing the numeral displayed at its said "place," said degree of rotation is always the same, and, as herein shown, equal to one-sixth of a revolution.

Among other things, this use of a like fraction (one-sixth) of a revolution for each rotative advance of a drum 77 or 78 and of various other drums present makes it possible to effectuate a number of marked savings in tool costs and in stamping out all the 18-toothed gears 111, 101, 106, 109, 83, 72 and 75 driven by the various hereinabove mentioned mutilated gears; in which connection it is pointed out that the mutilated two-toothed gear 87 was also when first stamped also an 18-toothed gear. Again, the gears 70 and 68 which, respectively, operate to rotate the drums 77 and 78, are identical, both being mutilated gears with 17 teeth. These gears 70 and 68 and the two-toothed gear 81 are of the same pitch diameter; and all of said gears if unmutilated would have 30 teeth. Another gear also has 30 teeth, this being the gear 108 for transferring motion from a "units of hours" drum to the "tens of hours" drum 114.

Furthermore, gears 92, 94, 96 and 98 also have the same pitch diameter, but these are 36-tooth gears; as would be the gears 94 and 98 if unmutilated. Said gears 94 and 98 are identical; each having 17 teeth, and gear 22 having two groups of teeth, one group comprising five teeth and the other group comprising 11 teeth.

Likewise, all locking discs, such as 69, 67 and 80 are of the same outside diameter, while the locking discs 93, 95 and 97 are of the same outside diameter. Although discs 93 and 97 are of larger outside diameter than the discs 69, 67 and 80, they are identical one with the other. And this last is true of the six driven discs 71, 74, 82, 100, 103 and 117.

Also, said use of a like fraction (one-sixth) of a revolution for the rotative advance as to all drums of both pairs of drums (one such pair the drums 77 and 78, at the "units of minutes" location, and the other pair, the drums 118 and 119, at the "units of hours" location) is responsible at both these plural-drum locations for the advantage that the change-over from a numeral carried by the drum 77 to a numeral carried by the drum 78, or vice versa, or from a numeral carried by the drum 118 to a numeral carried by the drum 119, or vice versa, can be as hereinabove described. That is, to have the transition from one numeral to the next numerically higher one effected in such manner that the change-over of numerals is in every case as though both numerals, the one caused to disappear and the one caused to appear in its stead, were carried on the same drum. Thus at any numerical-order location always one numeral will completely disappear and thereafter another numeral will appear in rotation in one continuous uninterrupted cycle and in proper successive order; said latter numeral being the next higher one during rotation in adding direction, and being the next lower one during rotation in subtracting direction.

Reverting to the change at said window 124 whereby the numeral "0" is substituted for the numeral "9," it is explained that at the initiation of this change from "9" to "0" the mutilated gear 81 (with two teeth, similar as already stated to the gear 61 of Fig. 1) comes into engagement with the gear 83 similar to the gear 72 of Fig. 11A and said gear 83 causes the required partial rotation of the "tens of minutes" drum 86, thereby to display at the window 125 of Fig. 2 the horologically appropriate numeral on said drum; it being pointed out that there is merely one drum, said drum 86, at the "tens of minutes" station, because only some one of the numerals "1," "2," "3," "4" and "5" ever need to be displayed.

Now referring to the coaction between the display parts at the "units of hours" and "tens of hours" locations or "places," said "places" located opposite the two windows at the left in Fig. 2:

At each ¹⁄₁₂ of a revolution of gear 92, the indication of another hour appears at one or both of the windows at the left in Fig. 2. This happens one minute later than a reading "59" (minutes) is had at the windows 124 and 125 in Fig. 2.

Referring to the "12" reading as shown in Fig. 2 at the two windows at the left in that view, when the next hourly reading is to be "1" the drum-fraction 115 will be swung to mask or cover over the "2" on drum 118. (A masking operation such as just mentioned is one which, as hereinabove explained, would be objectionable for a continuous uninterrupted cycle; but in the instance just named it is a movement which happens only twice in a 12-hour period of time measurement, and it permits the great advantage of using identical parts.) Said drum-fraction 115 was thus rotated because tooth E₁ of gear 98 rotated gear 109, and since gear 108 is also in mesh with gear 109 and gear 111, the drum 114 at the "tens of hours" location was rotated to change the previously displayed "1" to one of the blank spaces of said drum 114. At the next movement the "1" disappears, and in doing so uncovers the "2" on the outer drum 118, which stood stationary while the "1" of drum-fraction 115 covered said "2" and uncovered the same at the "units of hours" location and another blank space on the drum 114 was displayed. Next the gear 96 rotates the gear 106, and the "3" on said drum 118 appears; and simultaneously the gear 98 rotates the gear 109 and thereby moves the drum 114 to cause it to display the third blank space thereon and the drum-fraction 115 moves ahead to lie behind the drum 118. In U.S. patent to me No. 2,636,339, a drum-fraction or "mask" is employed, the same fixed relative to, indeed carried by, the drum 35 of said patent for rotation with the latter; whereas according to the present invention the drum-fraction, 115, is geared to the "tens of hours" drum 114 (thereby to make possible a units and tens of hours reading on drums rotating on vertical axes). The following movement is similar to the one already explained for the "units of minutes" drums 77 and 78; the tooth W of gear 96 engaging the gear 106 and thereby rotating the "3" out of sight, and simultaneously the gear 94 engaging the gear 101 and rotating the "4" on the inner drum 119 to bring said "4" into view, and so on, until the "8" on said drum 118 is stationed at the window next to the one at the extreme left in Fig. 2. On the next movement, the "8" disappears and the "9" on the outer drum 118 appears. When the "0" appears on the outer drum 118, at that moment the gear 98 starts to engage the gear 109 and the "1" on the drum 114 appears—said drum 114 at the "tens of hours" location; it being noted in this connection that the first tooth "1" of gear 98 is radially aligned with tooth "0" of gear 96.

When the "1" on drum 118 appears, the drum 114 will also show another "1," and now the hour "11" can be read.

Next the numeral "2" will appear on the drum 118, said drum 114 will display another "1," and the drum-fraction 115 will take up the position shown in Fig. 1, just ready to cover the numeral "2" and thereby on completion of said coverage to bring the reading to that which existed when the explanation was started at the beginning of the third preceding paragraph.

In order to simplify as much as possible the subject matter of Figs. 1 through 19, the drums in this embodiment constituting the rotatable numeral carriers are now shown as carrying inter-numeral graduations or calibrations.

It will be understood, however, where inter-numeral graduations are used in connection with the use of an arithmetical location or numerical "place" that, due to the necessarily smaller diameter of the inner drum, said graduations in all cases from "1" in regular numerical order to "9" and then "0" will not be absolutely precisely spaced apart the same distance. But their spacing would be sufficiently always uniform for all practical purposes. Assuming even that nested drums were employed having such unnecessarily thick side walls as, a 3" outside diameter for the outer drum and a 2⅞" outside diameter for the inner drum, the result would be merely that with the graduations about 0.240" apart on the inner drum they would be about 0.250" apart on the outer drum—a difference only of ten-thousandths of an inch, which would not be noticeable to the human eye, and would not be objectionable in many utilizations of the invention. However, even such a slight difference as that just noted would not be present where the two rotatable numeral carriers were dials instead of nested drums; as will become clear on reflection, and as will be made plain when the device of Figs. 20 through 23 is hereinbelow described in detail.

Figure 14:
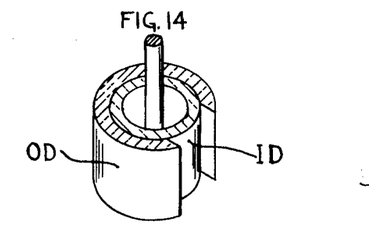
Fig. 14 is a top-broken-away perspective view of a pair of nested drums, with the thickness of their side walls as compared with their diameters very, very greatly exaggerated, in order to make it feasible to indicate clearly by standard cross-hatching the type of material of which said drums may be fabricated to make it possible to employ in connection therewith illuminative means located interiorly of the drums (it of course being understood that the side walls of said drums desirably will be of exceedingly small thickness; indeed, as thin as possible for stiffness and strength, thereby to have merely a minute difference between the ouside diameters of the inner and outer drums)

In the above connection, so far as nested drums are concerned, it again should be said, and emphasized, referring now to Fig. 14, that the two drums, one representative of an inner drum ID and the other representative of an outer drum OD, are shown as having side wall thicknesses very greatly exaggerated, to make graphic delineation of the fact that it is contemplated that said side walls may when desired be made of translucent material, for serving an illuminative purpose already explained.

Resetting of the clock embodiment above described may be readily had, as to minutes or hours reading or both; and although the advantage of a possible resetting was provided for pursuant to the disclosure of U.S. Patent 2,636,339 to me, according to the present invention either or both resettings are accomplished with more ease and facility than in said patent; and in connection with this comment, it is pointed out, as will be noted in the case of the present invention, thus there are two individually manipulative finger-pieces one for resetting the minutes reading and other for resetting the hours reading, and, most importantly, both these finger-pieces are wholly exposed for hand operation with perfect freedom and ease.

Now referring to the means whereby resetting is accomplished by the present invention in the above-described embodiment thereof, a collar, or sleeve 99' carries a plate 126, fastened both to the shaft 63 and to the collar 99, two pins 123 slidingly engaging the elements 80 and 81 and the other parts stacked one above another and so holding them for rotation as one unit with said elements 80 and 81, this congeries of parts being freely rotatable on the shaft 63. At the top of said shaft, above the top of the casing 66, is a finger-piece 127 in the form of a lift-knob. When said knob is manually lifted to a small extent, and the shaft 63 consequently is correspondingly elevated, the pins 123 maintain their engagement in the circular plate 126 and in the locking disc 67, but the driven disc 63' disengages from the locking disc 61, and the then engaged gear 64 is disaligned from the mutilated driving gear 62 and thereby the drive from the motor 60 is temporarily disconnected; and now the drums 77 and 78 at the "units of minutes" location and the drum 86 at the "tens of minutes" location can be reset. A snap-ring (not shown) can be provided to hold the shaft 63 against too extensive a downward movement incidental to preparation for the resetting and while the resetting takes place.

For the hours setting, pins 122 are provided for the same purpose and function in the same manner as explained above in connection with the pins 123. The shaft 91 is shown as also having at its top, above the top of the casing 66, a finger-piece in the form of a lift-knob 128. When said knob is manually lifted to a small extent, the shaft 91 consequently is correspondingly elevated and the gear 92 and disc 90 are then disengaged from the gear 88 and disc 87, to allow the resetting to be effected. A snap-ring (not shown) can here also be provided, in this case to hold the shaft 91 against too extensive a downward movement incidental to preparation for the resetting and while the resetting takes place.

Figures 2A, 15A, 16A, 19A, 24:
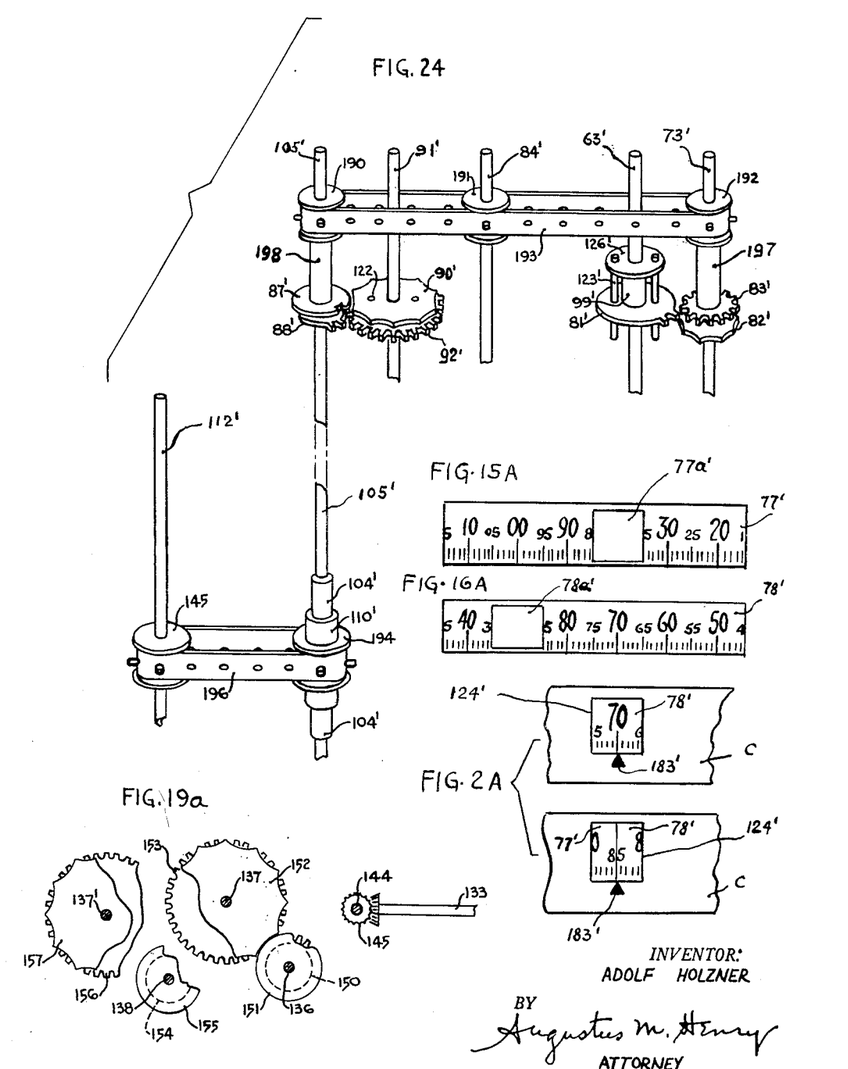
Fig. 2A is a composite delineation including upper and lower views each showing a portion of a cover or face plate like that seen in Fig. 2, but with, at each of said views, a different possible reading depicted where drum carriers of numerals and graduation lines are provided.
Fig. 15A is a view similar to Fig. 15, but constituting a development of a drum which could in function correspond to the drum of Fig. 15, but with said drum, in Fig. 15A, having larger numerals placed thereon which are multiples by ten of the numerals shown in said Fig. 15, and further having smaller intervening numerals marking values which are half-way between adjoining larger numerals, and further having graduation lines between said numerals.
Fig. 16A is a view similar to Fig. 16, but constituting a development of a drum which could in function correspond to the drum of Fig. 16, but with said drum, in Fig. 16A, carrying indicia complementary to the indicia on the drum 15A yet corresponding to the latter in that larger numerals and intervening smaller numerals are graduation lines are all present.
Fig. 19a may be described as a horizontal section taken in the line 19a—19a of Fig. 19, with certain overlying rotative parts partially broken away to aid in clear depiction of parts therebelow—with, however, said section modified as to the relative locations of the said vertical shafts to permit ideally close spacing of said numerical locations or "places;"
Fig. 24 is a perspective view showing a clock embodiment operating according to the principles of the invention illustrated in Figs. 1 through 18, but (in order to facilitate the making of very large clocks capable of being easily read at relatively great distances) incorporating, instead of toothed gears, tapes, chains or other elongate endless elements, for instance in combination with sprocket wheels or equivalents, capable of operating as motion transmitting instrumentalities.
Figure 19:
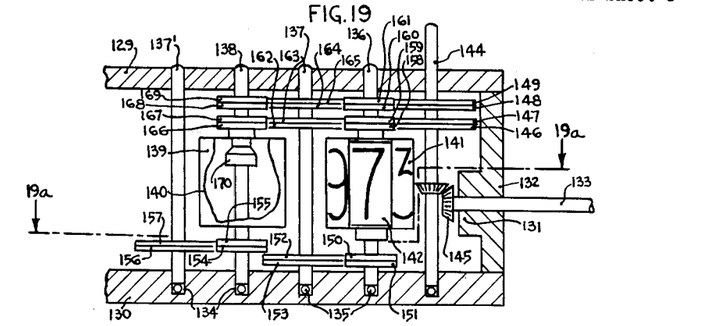
Fig. 19 is a view similar to Fig. 1, but showing an apparatus wherein the invention is embodied as a counter and characterized by the provision of a pair of nested drums at each numerical location of "place"—this view, however, being in a sense somewhat diagrammatic in that the relative placements of different vertical shafts are shown in a way best adapted to clarify the disclosure but not illustrative of a construction allowing the various numerical locations or "places" to be as closely spaced across the face of the counter as would be ideal for quick and easy total readings.

Referring next to the counter according to the invention illustrated in Figs. 19 and 19a, a casing is partially shown as including top and bottom walls 129 and 130 and an end wall 131 provided with a bearing as indicated at 132 for journaling (in an anti-friction bearing of course; not shown) an input shaft 133 to be connected or hooked up in the familiar way to a revolving part of a machine tool the operating cycles of which are to be counted. Blind holes 134 are drilled downwardly in the lower wall 130 for containing anti-friction balls for giving bottom mountings to the three vertical shafts shown, which shafts, marked 136, 137 and 138, correspond, respectively, to the shafts 63, 84 and 91 of Fig.

1; except that whereas in Fig. 1 the shaft 84 carries suspended therefrom merely one drum (the drum 86), in Fig. 19 the shaft 138 carries suspended therefrom two drums 139 and 140 (at the "tens" order or place) cooperating and actuated exactly the same as the drums 77 and 78 of Fig. 1. In the latter connection, it is explained that the two drums 141 and 142 of Fig. 19 and there (at the "units" order or place) shown as suspended from the shaft 136 (corresponding to the shaft 73 of Fig. 1) cooperate and are actuated also exactly the same as the drums 77 and 78 of Fig. 1; except that, in order to have the two drums 77 and 78 of Fig. 1 reversed in placement, the inner drum 142 of Fig. 19, which corresponds to the inner drum 78 of Fig. 1, is freely turnable on shaft 136 and has its elements 158 and 159, these corresponding to the elements 72 and 71 of Fig. 1, fastened to drum 142. The other drum 77 of Fig. 1 corresponds to the drum 141 of Fig. 19, and said drum 141 is secured to the shaft 136, as also are the elements 160 and 161, which last two elements correspond, respectively, to the elements 75 and 74 of Fig. 1. In Fig. 19 there will be noted, also, a shaft 144, which shaft 144 is functionally the same as the shaft 63 of Fig. 1; said shaft 144 being illustrated in Fig. 19 as connected to the input shaft 133 by simple bevel gearing as indicated at 145.

The shaft 144 has secured thereto elements similar to those secured to the shaft 63 of Fig. 1; the said elements secured to the shaft 144 being the elements 146, 147, 148 and 149 corresponding, respectively, to the elements 68, 67, 70 and 69 of Fig. 1.

The shaft 136 has secured thereto at its lower end, as elements similar to those secured to shaft 84 of Fig. 1, a mutilated gear 150, and a locking disc 151; while on the shaft 137 there are secured a ten-notched driven disc 152 and a gear 153 for rotating said shaft 137 one-tenth of a revolution each time the change from "9" to "0" takes place at the numerical place served by the nested drums 141 and 142.

The shaft 138 carrying the pair of drums 139 and 140 for the "tens" order or place has secured thereto, near its lower end, a mutilated gear 154 and a locking disc 155, these parts exactly like the elements 150 and 151 on the shaft 136.

It will be noted that the elements 154 and 155 on the shaft 138 are placed at a higher level than the elements 152 and 153 on the shaft 137; the purpose of this being to eliminate interference with the ten-notched driven disc 152 and the gear 153 on the "units"-place transferring shaft 137 and yet be arranged when required to engage elements on the shaft 137' for transferring the operation to the pair of drums (not seen) located at the "hundreds" place—such elements thus engaged on the shaft 137' being a gear 156 (like gear 153 on shaft 137) and a ten-notched driven disc 157 (like the disc 152 on shaft 137). Although not carefully so delineated in Fig. 19A, it will be understood that of course shafts 137 and 137' are aligned with the face plane of the counter, and that shafts 136 and 138 are similarly aligned.

For coaction of the elements 146, 147, 148 and 149 fixed on shaft 144, with elements on the shaft 136 carrying the nested drums 141 and 142, in the same manner as described in connection with Fig. 1 relative to the elements on the two shafts at the right in Fig. 1, the shaft 136 has located thereon elements 158 and 159 corresponding, respectively, to the elements 72 and 71 of Fig. 1, and said shaft has secured thereto the elements 160 and 161 corresponding, respectively, to the elements 75 and 74 of Fig. 1 on the shaft 63 in Fig. 1 carrying the two drums 77 and 78 at the "units of minutes" location or place.

On shaft 137 are secured elements 162, 163, 164 and 165 corresponding, respectively, to the elements 146, 147, 148 and 149 on the shaft 144; and on the shaft 138, above the drums 139 and 140 carried thereby, are located elements 166, 167, 168 and 169 corresponding, respectively, to the elements 158, 159, 160 and 161 on the shaft 136, above the drums 141 and 142 carried thereby.

The part 170 in Fig. 19 corresponds, in placement, purpose and function, to the part 121 of Fig. 1.

It will be recalled, from the brief description of Fig. 19 given near the beginning of this specification, that said Fig. 19 was stated in a sense to be somewhat diagrammatic; which statement was in regard to the intermediate drive shafts 137 and 137', which, desirably, are not spaced as indicated in Fig. 19, but, rather, as definitely illustrated in Fig. 19a. With said parts arranged as in Fig. 19a, one important objective is attained, which is to have the numeral carriers, in every case a pair of nested drums, at each of the "units," "tens," "hundreds," "thousands," and so on, "places," as closely alongside each other as possible; and at the same time another important purpose is attained, which is to provide an arrangement such that all the mutilated gears up near the top wall 129 of the casing of Fig. 19 can be on one plane, to use less space and achieve extreme compactness in a revolution counter having at each "place" a pair of nested drums for acting as the numeral carriers.

As should be understood, the input shaft 133 could enter the counter casing at its rear; and again, direct connection could be made (by way of the shaft 144, by suitably upwardly extending the same) to any moving part the movements of which are to be counted. Moreover, wherever the counter is desired to be mounted vertically on an instrument panel or given some analogous mounting, there is no detrimental effect on its operation when mounted flat so that all the shafts are horizontal.

Referring next to the illustrative embodiment of the invention shown in Figs. 20 through 23, here is illustrated a carrying out of the principles of the invention to provide a dial system for giving readings in seconds (fractions of minutes) and capable of serving in the same way as certain means illustrated, for instance, in U.S. Patent 2,576,119 to me and also in the aforesaid U.S. Patent 2,636,339 to me.

Figure 20:
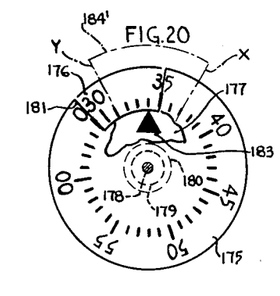
Fig. 20 is a face view of the main significantly indicatory parts of an embodiment of the invention incorporating a pair of dials each rotatable relative to the other about an axis including the axis of the other dial.

In said Figs. 20–23, a device is shown including a front dial 175 and a rear dial 176, these dials to be used in a device enclosed for instance in a casing 177 and to be operated by a gearing mechanism the same as employed in Fig. 1 for there operating the nested drums 77 and 78. Assuming the dial device is driven by a one r.p.m. synchronous motor, such that a shaft corresponding to shaft 63 of Fig. 1 is coupled to the motor, said shaft would then be parallel to shaft 178 of Fig. 20, and as the gearing of Fig. 20 is the same as above stated for Fig. 1, therefore elements corresponding to the elements 70, 69, 68 and 67 engage respectively in elements corresponding to the 75, 74, 72 and 71, and in this construction said elements corresponding to elements 75 and 74 are secured to hollow shaft 180 and said elements corresponding to the elements 72 and 71 are secured to shaft 178. Thus the substitution of the drums for the dials in Fig. 20 is such that rear dial 176 is secured to hollow shaft 180 and the front dial 175 is secured to the shaft 178. Consequently, the operation of both dials of Fig. 20 is precisely like that of the two drums 77 and 78 of Fig. 1.

While the motor is running, the operation of the device proceeds, first by prevised rotation of the dials and then by prevised rotation of the other dial, in such manner that the rotary parts of the device coact by constant rotation of one or more thereof to give a continuous display of seconds readings, these readings changing, by one second at each change, as time passes.

Figure 21:
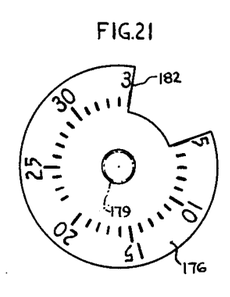
Fig. 21 is a view similar to Fig. 20, for showing individually one of the two dials seen in Fig. 20.

The markings on the front faces of the front and rear dials are shown in Figs. 20 and 21, these markings on both dials being numerals and graduations between such numerals.

In the case of the dial 175 (Fig. 20)—said dial being provided with a window 181 in the shape of a fraction of an annulus (said window 181 having opposite ends extending along lines radial to the axis shafts 178 and 179), the numerals carried by said dial 175 are, it will be noted a "0", a "00", a "55", said other numerals each being a different multiple of 5, to wit, the numerals "50", "45", "40" and "5". As will be noted in Fig. 20, one of said opposite ends of said window 181 is alongside the "0" and the other or said ends is alongside the "5".

At 179' is indicated an electric light bulb for illuminating the dials, the numerals in which (as also may be the case with the numerals of nested drums) may be perforations-established.

Relative to the disc 176 (Fig. 21), which is shown as of the same diameter as the disc 175, said disc 176 also is shown as having a window, 182, exactly like the window 181 of the disc 175; and in the case of this window 182 one of its two opposite radially extended ends is alongside a "3" and the other of its said two ends is alongside a "5". Said "3" and "5" are, together with the numerals "10", "15", "20", "25" and "30", the numerals carried on the face of the rear disc 176, with between each pair of adjoining ones of said numerals five graduations, as in the case of the front dial 175.

Figure 22:
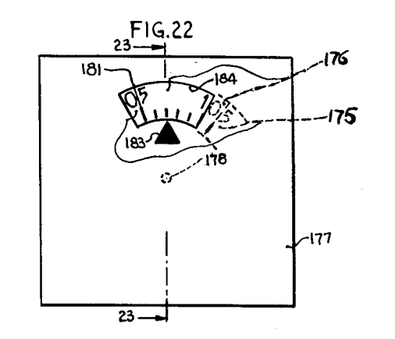
Fig. 22 is a frontal face view of a device having a casing enclosing the said two dials and elements of the mechanism for rotating either dial relative to the other.
Figure 23:
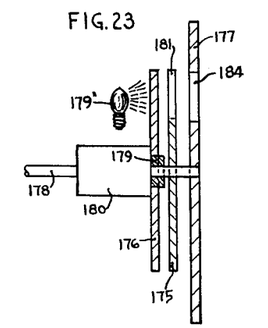
Fig. 23 is a transverse section, taken substantially on the line 23—23 of Fig. 22, but with the casing omitted.

The front wall of the casing 177 carries a fixed index 183 as shown in Figs. 20 and 22, and above said index said wall has a window 184; this window, too, in the shape of a fraction of an annulus. The location of this window 184, relative to the dials 176 and 175 and the windows of the latter as these elements are shown in Fig. 20, is indicated in Fig. 20 by the dot and dash delineation 184'.

Operation:

As the parts are shown in Fig. 20, the reading is 34 seconds, the "30" and also the graduation indicative of "4" opposite the index 183 being on the rear dial 176, while the confirmatory numeral "35" has its "3"-component on the rear dial 176 and its "5"-component on the front dial 175.

As second after second thereafter elapses, both dials rotate together (in a counter-clockwise direction, where they carry numerals like those illustrated) the same as though said "35" were on one single drum rotating in said direction.

At the moment the "5" of the front dial 175, or, perhaps better to express it, the window 181 of the front dial, disappears by travelling beyond the line Y of Fig. 20 (this line for giving the locus of one of the aforesaid opposite radially extended ends of the window 184 of the casing front wall 177), the rear dial 176 becomes stationary and the front dial 175 moves ahead to display its readings one after another until the "00" and the "0" thereof, or the window 181 of the front dial 175 appears at the line X of Fig. 20 (this line X for giving the locus of the other radially extended end of the casing's window 184).

From this moment on, the rear disc 176 will also move along, and so both dials will move together as one unit with display of the "0" on the front dial 175 and display of the "5" on the rear dial 176, and both dials, will continue to move together so that, as shown in Fig. 22, the reading is 07 seconds (with the reading 05 now advanced to the left of window 184).

At the moment the "0" of the front dial 175 disappears behind the casing's window 184, said front dial becomes stationary, and the rear dial 176 continues its rotation to display its readings one after another until its "30" and its "3" are seen at the said line X; and as soon as the "3" moves ahead the "5" of the rear dial 176 moves along, and we arrive at the display of the reading "34", which was the reading when this explanation of operation was started.

Should it be desired to have the shaft of the aforesaid synchronous motor directly in line with the axis of the two dials 175 and 176, a one to one gear ratio may be used for driving the aforesaid shaft corresponding to the shaft 63, and parallel to shaft 178 as already mentioned.

As explained the display of seconds is a uniform one.

The invention, however, could be used without either dial being moving at a uniform rate of speed or, indeed, of always moving in the same direction. That is to say, the front and rear dials could register by their movements over a range of 60 minute fractions of a degree, or any other selected division of a series of numbers and graduations such as used for a 360° compass dial. Then, of course, according to the rate of speed of a turning movement of a ship or any other moving object carrying the compass, the shaft on which such dial would be mounted would be rotated sometimes slow and sometimes fast and sometimes backward and sometimes forward, and at any display of a reading stand still. In this particular case, there would not be the requisite that operating mechanism for the two dials would have to be so limited as to insure always that both dials rotate at the same speed, either singly or together, and the invisible opening of the rear dial which will never be seen, and the jouncing of the two dials, can be anywhere; because the action is always equivalent to that of a single dial, and yet there can be in certain instances one-half of a numeral on one dial and the other half of said numeral on the other dial—but even so, the reading would never be misleading in the two movements of the two dials as hereinabove explained.

Should it be desired to use three dials, this could be done, by dividing the series of desired readings by three. This, however, is now thought to be less practical than the use of two dials as above. In any case, it is believed, no further explanation is here necessary; it being obvious that there would have to be used three gears, each mutilated to have 17 remaining teeth chopped out of a gear having 45 teeth spaced uniformly circumferentially thereof, and aligned so that always two teeth of two gears are overlapping.

Referring now to Fig. 24, and pointing out that for a very large outdoor clock, for transfer of a movement of the "minutes" reading over to the "hours" reading, and also for transfer of a movement of the "hours" reading over to the "tens of hours" reading, it is of great importance to use something other than intermeshing operating elements such as gears because in this instance the drums are spaced a considerable distance apart due to the large outside diameters of the number-drums, a tape or chain is used operatively to connect these drums and at the same time there are used locking discs and driven discs and mutilated gears as included in the embodiment of Fig. 1. Especial note should be taken of the importance in this large clock construction of making use of elements like those employed for a smaller clock construction such as shown in Fig. 1.

In Fig. 24, an arrangement is shown including parts corresponding, respectively, to parts of Fig. 1, said parts given the same reference numerals as in Fig. 1, but with primes added. Thus, for example, in Fig. 24 there will be seen at 73' the equivalent of the shaft 73 of Fig. 1, and a shaft 63' the equivalent of the "units and tens of minutes" drive shaft 63 of Fig. 1, and so on. On each of the shafts 73', 84' and 105' are, respectively, a pulley or sprocket wheel 192, 191 or 190, all of the same working diameter; these wheels aligned and operatively coupled for simultaneous rotation all in the same direction by a tape, belt and chain 193. Pulley 192 is fastened to a bushing 197 on shaft 73' and as are gear 83' and disc 82". Pulley 190 is fastened to a bushing 198 on shaft 105', as are gear 88 and disc 87. Both bushings 197 and 198 are freely turnable on their respective shafts 73' and 105'. Pulley 191 is secured to shaft 84'. A second pulley or sprocket wheel 194, below the sprocket wheel 190, is secured to the sleeve 110', and a pulley or sprocket wheel 145 is secured to the shaft 112', these two pulleys being aligned, and of the same working diameter, and operatively coupled for simultaneously rotating both in the same direction by a tape, belt or chain 196.

In connection with the present invention, the use of graduation lines between numerals has already been explained in connection with the dials of Figs. 20 to 22 and the value and importance of such use has been made clear, at least so far as concerned any embodiment of the invention in which the indicia carriers are dials.

The following explanation, making now special reference to Figs. 2A, 15A and 16A, will make plain, also, the value of the feature of the invention just alluded to in connection with an embodiment of the invention involving the use of a pair of nested drums, as the drums 77' (of Fig. 15A) and 78' (of Fig. 16A) corresponding, respectively, to the drums 77 and 78 of Fig. 1; it being noted that the opening 77a' of the outer drum 77' corresponds to the opening 77a of the outer drum 77 of Fig. 1 (see also Fig. 15) and that the space 78a', whether a plain space or an opening, corresponds to the space 78a of the inner drum 78 of Fig. 1 (see also Fig. 16). In Fig. 2A, the reference C, in both instances, indicates such a cover plate as is illustrated in Fig. 2, while 124' indicates a window corresponding to the window 124 of Fig. 2, and the index mark 183' in Fig. 2A corresponds to the index mark 183 of Figs. 20 and 22.

As in the case of the embodiment of Fig. 20, graduation lines are shown between the numerals on the drums 77' and 78', while, as Figs. 15A and 16A are shown, said drums 77' and 78' carry larger numerals, each of these multiples by ten of an integer, and smaller numerals, half-way between said larger numerals, each of these smaller numerals a multiple of five of an integer; all has already been explained at the brief descriptions of Figs. 15A and 16A near the beginning of this specification.

In the upper view of Fig. 2A, only the indicia on the inner drum 78' are seen; while in the lower view of Fig. 2A, indicia not only on the inner drum 78' but also on the outer drum 77' are seen. Note that in this last case the smaller numeral "85" is composed of a "5" shown in Fig. 16A as located immediately to the right of the space 78a' of the inner drum 78', and also of an "8" shown in Fig. 15A as located immediately to the left of the opening 77a' of the outer drum 77'.

The readings presented by the numerals and graduation lines above described would result simply from rotating shaft 63 either in adding or subtracting direction (that is, forward or backward), and the correct reading by aid of the graduation lines as well as the indicia constituted by the numerals will always be correctly taken at the index 183'.

Readings as above, which may be called fractional in that at the taking of a reading a particular graduation line rather than a numeral is aligned with the index 183' are frequently used in connection with the first number drum of a revolution counter, as explained, for instance, in U.S. Patents 2,540,619 and 2,633,298 to me (where a horizontal axis of rotation is shown); but, as it is now to be pointed out, the same feature can be applied to a counter incorporating a bank of pairs of nested drums such, for instance, as shown in Fig. 19 hereof; and, again, said feature can be availed of in connection with a single pair of nested drums in any one of various instruments by placing any series of readings partially on one of said pair of drums and partially on the other.

It may finally be said that anyone skilled in the art and reading in the hereinabove contained description of the embodiment of Fig. 1 should not find it in any way difficult to use the drum 35 and its mask as described in the aforesaid U.S. Patent 2,636,339 to me and by the teaching thereof design and construct other registering instruments, such for example, as a 24-hour clock mechanism, for operation according to the novel and important principles of the present invention, that is, for example (and now referring by reference characters to a part shown in Fig. 1 of the present specification), by placing appropriate display numerals on two drums employed at each of the "units of hours" and "tens of hours" locations, and by providing a gear ratio or ratios such that shaft 91 would at each actuation thereof be fractionally rotated $\frac{1}{24}$ of a revolution.

As will be understood, some only of the many possible and widely diverse embodiments of the invention have been shown. They have been described with considerable particularity of detail, not for purposes of limitation, of course, but to attempt to illustrate some of the at present realized capabilities of the present invention. As will be understood, also, variations and modifications are possible, and parts of the improvements may be used without others. The scope of protection contemplated is to be taken from the appended claims.

It will be realized that a change can be made in the vertical clock construction, so that the two sets of nested drums i.e. one set for the unit of minute drums 77 and 78 and another set for the unit of hour drums 118 and 119 can be replaced with a single conventional drum having numerals 0 to 9 thereon. It is to be understood when using a single drum, one for the unit of minutes and another for the unit of hours, the diameter of the drums would have to be larger than that of the tens of minutes drum and the tens of hours drum and that all the outside diameters of all the drums have to be aligned linearly. Such a vertical clock construction would clearly come within the spirit of this invention in which the vertical transfer mechanism and vertical mask arrangement stays the same as well as the endless flexible drive.

It is not necessary to have the number 1 on the auxiliary element. It could be done, for example, with the number 2 thereon, instead of number 1, so that the 2 covers the 1 on the unit of hour drum at 12 o'clock and uncovers the same at 1 o'clock.

Also another variation of this invention is using a single drum for the unit of hour reading having 10 fields, wherein at 9 fields the numerals 1 to 9 are distributed thereon and the tenth field is provided with an opening and the auxiliary element displays its numerals 0, 1, 2, through said opening.

Moreover for a 12 hour clock the auxiliary element can be eliminated by using a single drum for the unit of hour window having 12 equally divided fields and having the numerals 1, 2, 3, 4, 5, 6, 7, 8, 9, 0, 1, 2, thereon and have it geared to the tens of hour drum 114, so that they would rotate together as one unit, the same as described for the nested set of drums 118 and 119 at 10 o'clock, 11 o'clock, 12 o'clock, and 1 o'clock.

I claim:

1. In an indicator, at least two rotatable elements, one element having a first series of consecutive numbers and an aperture, and the other element having a second series of consecutive numbers and a blank space without numbers, said second series of numbers being consecutive with said first series and means connected to drive said elements comprising a gear secured to each element, a sectional gear connected to each of said gears, at least one tooth on both ends of each sectional gear being aligned with at least one tooth of the other adjoining sectional gear, said sectional gears being adapted to rotate said elements alternately and also rotate both elements together at the time the change over from one element to the other element takes place, whereby the numbers of both series move uninterruptedly past a viewing point so that there is always exhibited part of a leading numeral the visible area of which gradually decreases and simultaneously a part of a trailing numeral the visible area of which gradually increases to give exactly the same visual effect as though both numerals were on one single rotatable element of much greater dimensions that the dimension of said rotatable elements.

2. A counter having a plurality of vertically disposed linearly spaced-apart circular means each having a plurality of consecutive numbers thereon, at least one of said circular means being a pair of elements, said pair of elements consisting of an outer element and an inner element, said outer element having an opening for viewing the numbers on the inner element, a first driving means alternately rotating each element with an intermediate joint rotation of both elements between each individual rotation to give a consecutive presentation of numerals, and a second driving means for overall consecutive actuation of said circular means.

3. The counter of claim 2 wherein said circular means are cylindrical drums and wherein the second driving means is a gear train adapted for selective gear operation.

4. The counter of claim 2 wherein said circular means are cylindrical drums and wherein the second driving means includes a plurality of flexible belts.

5. A clock comprising a casing having four parallel windows for viewing time numerals; a plurality of four cylindrical means having numbers thereon vertically disposed behind said windows for consecutive displaying of said numbers one at a time; at least one of said cylindrical means consisting of at least two cylindrical drum elements of an inner drum and an outer drum having a window in its surface; a first operative means for operating said inner drum alternately and independently of said outer drum; a second operative means operating said outer drum alternately and independently of said inner drum and interconnected cylindrical means operating mechanism consisting of a plurality of vertical transfer shafts for over-all successive operation of said four cylindrical means from an extreme right window reading units of minutes to an extreme left window reading tens of hours said first and said second operative means for said nested drums rotating as a unit twice in a 360 degree cycle.

6. A clock having four vertical windows for left from right reading of units of minutes, tens of minutes, units of hours, and tens of hours respectively comprising at least one numerated vertical drum behind each window and means connected to drive said vertical drums for successive over-all operation comprising a first transfer vertical driven shaft disposed between the units of minutes drum and the tens of minute drum directly connected to said units of minutes drum and selectively connected directly to operate said tens of minute drum at ten minute intervals, and a second vertical transfer driven shaft operated at 60 minutes intervals connected to and disposed between said tens of minute drum and said units of hour drum, and a third vertical transfer driven shaft located between the units of hour and tens of hour drum for transmitting motion to said tens of hour drum at ten hour intervals and also between ten hour intervals.

7. In a cyclometer having a casing with a plurality of linearly disposed windows, a plurality of rotatable means having numbers thereon disposed behind each window wherein at least one of said rotatable means is one pair of nested separately rotatable elements adapted for alternate individual rotation and simultaneous rotation to effect a continuous presentation of substantially like sized numbers thereby giving the reader the illusion of the numbers being on a single element, and motion transfer means for rotating said rotatable means, adapted to present time reading in tens and units of hours and tens and units of minutes wherein said pair of nested rotatable elements are units of hours elements provided with a third masking rotatable element.

8. The clock of claim 7 comprising gear means of operating said tens of hours rotatable means in direct ratio with said masking rotatable element whereby the time change from 12:59 o'clock to 1:00 o'clock is made by rotational disappearance of the tens of hours numbers.

9. The clock of claim 8 having gear means for selective simultaneous rotation of said masking drum and one of said nested drums and having gear means for independent rotation of said masking element while said nested rotatable elements are stationary.

10. A clock having four vertical windows for left from right reading of units of minutes, tens of minutes, units of hours, and tens of hours respectively comprising at least one numerated vertical drum behind each window and a rotational numerated vertical auxiliary element adapted to present numbers in the units of hour window and direct ratio means operatively connected to said units of hours drum for operating said auxiliary element and said tens of hours drum as a unit.

11. A clock having four vertical windows for left from right reading of units of minutes, tens of minutes, units of hours, and tens of hours respectively comprising at least one numerated vertical drum behind each window and rotational numerated auxiliary element adapted to present numbers in the units of hour window including a first transfer vertical driven shaft disposed between the units of minutes drum and the tens of minute drums directly connected to said units of minutes drum and selectively connected directly to operate said tens of minute drum at ten minute time intervals, and a second vertical transfer driven shaft connected to and disposed between said tens of minute drum and said units of hours drum, said auxiliary element also being operatively connected to said second driven shaft, and a third vertical transfer driven shaft located between the units of hour and the tens of hour drums for transmitting motion to said tens of hour drum.

References Cited in the file of this patent

UNITED STATES PATENTS

| | | |
|---|---|---|
| 329,078 | Phillips | Oct. 27, 1885 |
| 1,929,582 | Greenwood | Oct. 10, 1933 |
| 2,065,491 | Harm | Dec. 22, 1936 |
| 2,098,302 | Morris | Nov. 9, 1937 |
| 2,272,242 | Frischknecht | Feb. 10, 1942 |
| 2,351,814 | Holzner | June 20, 1944 |
| 2,570,803 | Hausen | Oct. 9, 1951 |
| 2,636,339 | Holzner | Apr. 28, 1953 |
| 2,762,190 | Holzner | Sept. 11, 1956 |
| 2,858,029 | Rabinow | Oct. 28, 1958 |

FOREIGN PATENTS

| | | |
|---|---|---|
| 285,157 | Germany | June 22, 1915 |
| 472,208 | Italy | June 11, 1952 |
| 938,603 | France | Apr. 12, 1948 |